US005735311A

United States Patent [19]

Ishizaki et al.

[11] Patent Number: 5,735,311
[45] Date of Patent: Apr. 7, 1998

[54] PRESSURE COMPENSATION VALVE

[75] Inventors: Naoki Ishizaki; Mitsumasa Akashi, both of Tochigi-ken, Japan

[73] Assignee: Komatsu, Ltd., Tokyo, Japan

[21] Appl. No.: 750,876

[22] PCT Filed: Jul. 11, 1995

[86] PCT No.: PCT/JP95/01377

§ 371 Date: Dec. 20, 1996

§ 102(e) Date: Dec. 20, 1996

[87] PCT Pub. No.: WO96/01951

PCT Pub. Date: Jan. 25, 1996

[30] Foreign Application Priority Data

Jul. 12, 1994 [JP] Japan .................. 6-159926

[51] Int. Cl.[6] .................................................. F15B 11/05
[52] U.S. Cl. .................................. 137/596; 60/452; 91/446
[58] Field of Search ...................... 60/427, 452; 91/446, 91/518; 137/596

[56] References Cited

FOREIGN PATENT DOCUMENTS 60-11706  1/1985  Japan .
4-244605  9/1992  Japan .

*Primary Examiner*—Gerald A. Michalsky
*Attorney, Agent, or Firm*—Ronald P. Kananen

[57] ABSTRACT

A pressure compensation valve comprises a check valve portion having an inlet port that is connected to a discharge path of a hydraulic pump, an outlet port that is connected to an inlet side of a directional control valve, and a valve for controlling an area of opening between both ports. A pressure reduction valve portion has a spool that defines at its both sides a first pressure chamber and a second pressure chamber, respectively, and is adapted to be slidable to allow the valve to be thrusted in a first direction in which the area of opening is increased under a self-load pressure applied to the first pressure chamber and to be slidable to allow the valve to be thrusted in a second direction in which the area of opening is decreased under a pressure within the second pressure chamber. An internal passage is formed inside of the spool and is adapted to supply a discharge pressure fluid of the hydraulic pump to the second pressure chamber when the spool has been slid to assume not less than a predetermined displacement made in the first direction.

2 Claims, 3 Drawing Sheets

PRESSURE COMPENSATION VALVE

TECHNICAL FIELD

The present invention relates to a pressure compensation valve for use in a hydraulic circuit, e. g. a hydraulic circuit for supplying a discharge pressure fluid from one or more hydraulic pumps to a plurality of actuators in distributed flow rates in a construction machine.

BACKGROUND ART

If it is attempted to supply a discharge pressure fluid from a hydraulic pump to a plurality of actuators, it has generally been known that the pressure fluid tends to be admitted only to an actuator of the lowest load pressure. In order to resolve this problem, it has been known to make use of a certain hydraulic circuit, for example, as disclosed in Japanese Unexamined Patent Publication No. Sho 60-11706. In such a hydraulic circuit, a pressure compensation valve is provided, respectively, at the inlet side of a directional control valve that is arranged for each of the actuators. More specifically, this is a hydraulic circuit in which each of the pressure compensation valves is set for the highest of different load pressures which are met by the respective actuators so that a plurality of actuators of the varying load pressures may be fed with a discharge pressure pressure with distributed flow rates.

An example of the pressure compensation valve which can be used in such a hydraulic circuit has been known that is disclosed, for example, in Japanese Unexamined Patent Publication No. Hei 4-244605.

This is a pressure compensating valve in which as shown in FIG. 1 of the drawings attached hereto, a valve body 1 includes a check valve portion 5 that is provided with a check valve bore 1a having an inlet port 2 and an outlet port 3, the said check valve bore 1a having a valve 4 slidably fitted therein for establishing and blocking a communication between the inlet port 2 and the outlet port 3. The above mentioned valve body 1 also includes a pressure reduction valve portion 12 that is provided with a pressure reduction valve bore 1b having a first port 6, a second port 8 and a third port 9, the said pressure reduction valve bore 1b having a spool 11 slidably fitted therein and having at its two ends, respectively, a first pressure chamber 7 that communicates with the first port 6 and a second pressure chamber 10 that communicates with the third port 9 and in which under a pressure in the first pressure chamber 7 the above mentioned spool 11 is thrusted rightwards for establishing a communication between the second port 8 and the third port 9, and under a pressure in the second chamber 10 the said spool 11 is thrusted leftwards for blocking the communication between the second port 8 and the third port 9. At this point it should be noted that the above mentioned spool 11 is designed to be thrusted by a spring 13 in such a direction as to block the communication between the second port 8 and the third port 9 and then for abutment on the above mentioned valve 4. And, the said pressure compensation valve is constituted of these components.

If such a pressure compensation valve is adopted, it can be seen that when a pressure within the first pressure chamber 7 is higher than a pressure within the second pressure chamber 10, the said spool 11 will be displaced rightwards to depart from the valve 4 and to position the valve 4 so as to make a pressure in the inlet port 2 equal to a pressure in the outlet port 3. As a result, it can also be seen that a pressure within the first pressure chamber 7 and a pressure within the second pressure chamber 10 will be made equal to each other. On the other hand, it can be noted that when a pressure within the first pressure chamber 7 is lower than a pressure within the second pressure chamber 10, the valve 4 will be thrusted with the spool 11 into its blocking position so that the pressure in the outlet port 3 may be made lower than the pressure in the inlet port 2 by a pressure difference between the second pressure chamber 10 and the first pressure chamber 7.

This being the case, it can be seen that by connecting the outlet port 3 to a pump port 15 of a directional control valve 14, connecting the first port 6 to an outlet port 16 of the directional control valve 14 to introduce a self-load pressure PI into the first pressure chamber 7, connecting the third port 9 to a load pressure detecting passage 17 to introduce a control pressure $P_{LS}$ into the second pressure chamber 10 and connecting a discharge outlet 19 of a hydraulic pump 18 to the inlet port 2 and the second port 8, the pump discharge pressure $P_0$ will be capable of being reduced by the differential pressure $(P_{LS}-P_1)$ which is the control pressure $P_{LS}$ minus the self-load pressure $P_1$, to yield an output pressure that is furnished at the outlet port 3.

For example, if $P_0$ is 120 kg/cm$^2$ and $P_{LS}$ and $P_1$ are each 100 kg/cm$^2$, the output pressure $P_2$ will be 120 kg/cm$^2$. Also, if $P_0$ is 120 kg/cm$^2$, $P_1$ is 10 kg/cm$^2$ and $P_{LS}$ is 100 kg/cm$^2$, the output pressure $P_2$ will be 30 kg/cm$^2$.

By the way, it should be noted that such pressure compensation valves will, for example, as shown in FIG. 2 of the drawings attached hereto, be disposed at the inlet sides of a plurality of directional control valves 14, respectively, provided in the discharge path 19 of the hydraulic pump 18 so that the respective third ports 14 of all the pressure compensation valves may communicate with the load pressure detecting path 17 and that the respective second pressure chambers 10 of all the pressure compensation valves may have acted thereon the self-load pressure $P_1$ of all the pressure compensation valves, that is, the highest of the different load pressures of all of actuators 20. At this point, it will be apparent in FIG. 2 that the pressure compensation valves are each schematically shown.

In FIG. 2, there are also shown a swash plate 22 for controlling the flow rate of the discharge fluid of the hydraulic pump 18, a servo cylinder 23 and a pump swash plate angle control valve 24. The said pump swash plate angle control valve 24 is designed to be switchingly operated in response to a pressure difference between the pump discharge pressure $P_0$ and the load pressure $P_{LS}$ to apply the pump discharge pressure $P_0$ to the servo cylinder 23, thereby altering the angle of the swash plate 25 so as to function to maintain the pressure difference between the pump discharge pressure $P_0$ and the load pressure $P_{LS}$ always constant. At this point it should be noted that the load pressure detecting path 17 is connected via a throttle 25 to a reservoir 26.

In the hydraulic circuit of FIG. 2, however, where the plurality of the directional control valves 14 are operated simultaneously to operate all the actuators 20 concurrently, it will be noted that if a single actuator 20 is assumed to have taken its displacement end position, the fact that there is no pressure fluid that flows between the inlet and outlet ports should bring about the situation in which the discharge fluid pressure $P_0$ of the hydraulic pump 18 is rising to the set pressure for a main relief valve 21. As a consequence, the load pressure $P_1$ of that actuator 20 which has taken the displacement end position will be made equal to the pump discharge pressure $P_0$ and the load pressure $P_{LS}$ will be made equal to the pump discharge pressure $P_0$, too. Thus, since the spool 11 is displaced rightwards so that the second port 8 and the third port 9 may communicate with each other, the load pressure $P_{LS}$ will be made equal to the pump discharge pressure $P_O$.

For this reason, the above mentioned set pressure for the said main relief valve 21 will act on the second chamber 10 of the pressure compensation valve that is connected to another actuator 20 which has not reached its displacement end. And, since its first pressure chamber 7 has acted thereon the self-load pressure $P_1$ that is lower than the said set pressure for the main relief valve 21, the spool 11 will act to thrust the valve 4 of the check valve portion 5 in the direction in which a communication between the inlet port 2 and the outlet port 3 can be blocked. As a result, with the communication between the inlet port 2 and the outlet port 3 blocked, there will be no pressure fluid for supply to that actuator 20 which has not yet reached its displacement end and which will therefore is brought to a halt.

Accordingly, with the above mentioned problems in the prior art taken into account, it is an object of the present invention to provide a pressure compensation valve whereby in a hydraulic circuit for feeding a discharge pressure fluid from a single hydraulic pump to a plurality of actuators in distributed flow rates where all of the plurality of the actuators are simultaneously operated by concurrently operating the like plurality of directional control valves, even if a certain actuator has taken its displacement end position, there can be no stoppage of any other actuator.

SUMMARY OF THE INVENTION

In order to achieve the object mentioned above, there is provided in accordance with the present invention, a pressure compensation valve, characterized in that it comprises:

a check valve portion having an inlet port that is connected to a discharge path of a hydraulic pump, an outlet port that is connected to an inlet side of a directional control valve and a valve for controlling an area of opening between both said ports; and a pressure reduction valve portion which is comprised of a spool that defines at its both sides a first pressure chamber and a second pressure chamber, respectively, and is adapted to be slidable to allow the said valve to be thrusted in a first direction in which the said area of opening is increased under a self-load pressure applied to the said first pressure chamber and to be slidable to allow the said valve to be thrusted in a second direction in which the said area of opening is decreased under a pressure within the said second pressure chamber, an internal passage that is formed inside of the said spool and that is adapted to supply a discharge pressure fluid of the said hydraulic pump to the said second pressure chamber when the said spool has been slid to assume not less than a predetermined displacement made in the said first direction, a first throttle that is disposed in the said internal passage, and a port for establishing a communication between a load pressure detecting path that is connected via a second throttle to a reservoir and the said first throttle.

According to the construction mentioned above, since the pressure fluid within the said second pressure chamber is allowed to flow through the said throttle into the said load pressure detecting path and a portion of the said pressure fluid is allowed to flow via the said throttle of the load pressure detecting path into the said reservoir, it can be seen that there will develop a constant flow and that there will also develop a pressure difference behind and ahead of the said throttle and that as a result, a load pressure of the said load pressure detecting path will be lower than a pressure within the said second pressure chamber.

Accordingly, in case where a pressure compensation valve is disposed, respectively, at the inlet side of each of a plurality of directional control valves in a hydraulic circuit for supplying a discharge pressure fluid from a single hydraulic pump through these directional control valves to the respective actuators so that all load pressure detecting paths may be brought together and all the pressure compensation valves may be set with the highest load pressure, it can be seen that even if any single actuator has taken its displacement end position so that the pump discharge pressure may be made equal to each other, a load pressure within a said pressure detection path will be made lower than the pump discharge pressure. Consequently, it can be noted that a pressure within the said second actuator of the pressure reduction portion in the pressure compensation valve for any other actuator which has not yet reached its displacement end position will be lower than the pump discharge pressure and since there will be no closure of the said valve in the check valve portion of that pressure compensation valve, the said any other actuator will be capable of receiving the pump discharge pressure fluid and hence may not be stopped.

In addition to the construction mentioned above, it is preferred that:

the said valve of the said check valve portion and the said spool of the said pressure reduction valve portion be arranged to be each slidable and are disposed coaxially in an opposing relationship with each other in a valve body;

when the said valve has been slid towards the said spool by a preselected distance, the said inlet port and the said outlet port be adapted to communicate with each other;

the said spool be adapted to be slid under a pressure in the said first pressure chamber in the said first direction away from the said valve and to be slid under a pressure in the said second pressure chamber in the said second direction towards the said valve;

the said valve body be formed therein with a port that is connected to a discharge path of the said hydraulic pump; and when the said spool has been slid by a given distance in the said first direction, the said internal passage in the said spool be adapted to allow the last mentioned port to communicate with the said second chamber.

BRIEF EXPLANATION OF THE DRAWINGS

The present invention will better be understood from the following detailed description and the drawings attached hereto showing a certain illustrative embodiment of the present invention. In this connection, it should be noted that such a embodiment as illustrated in the accompanying drawings is intended in no way to limit the present invention, but to facilitate an explanation and understanding thereof.

In the accompanying drawings.

BEST MODES FOR CARRYING OUT THE INVENTION

Figure 1:
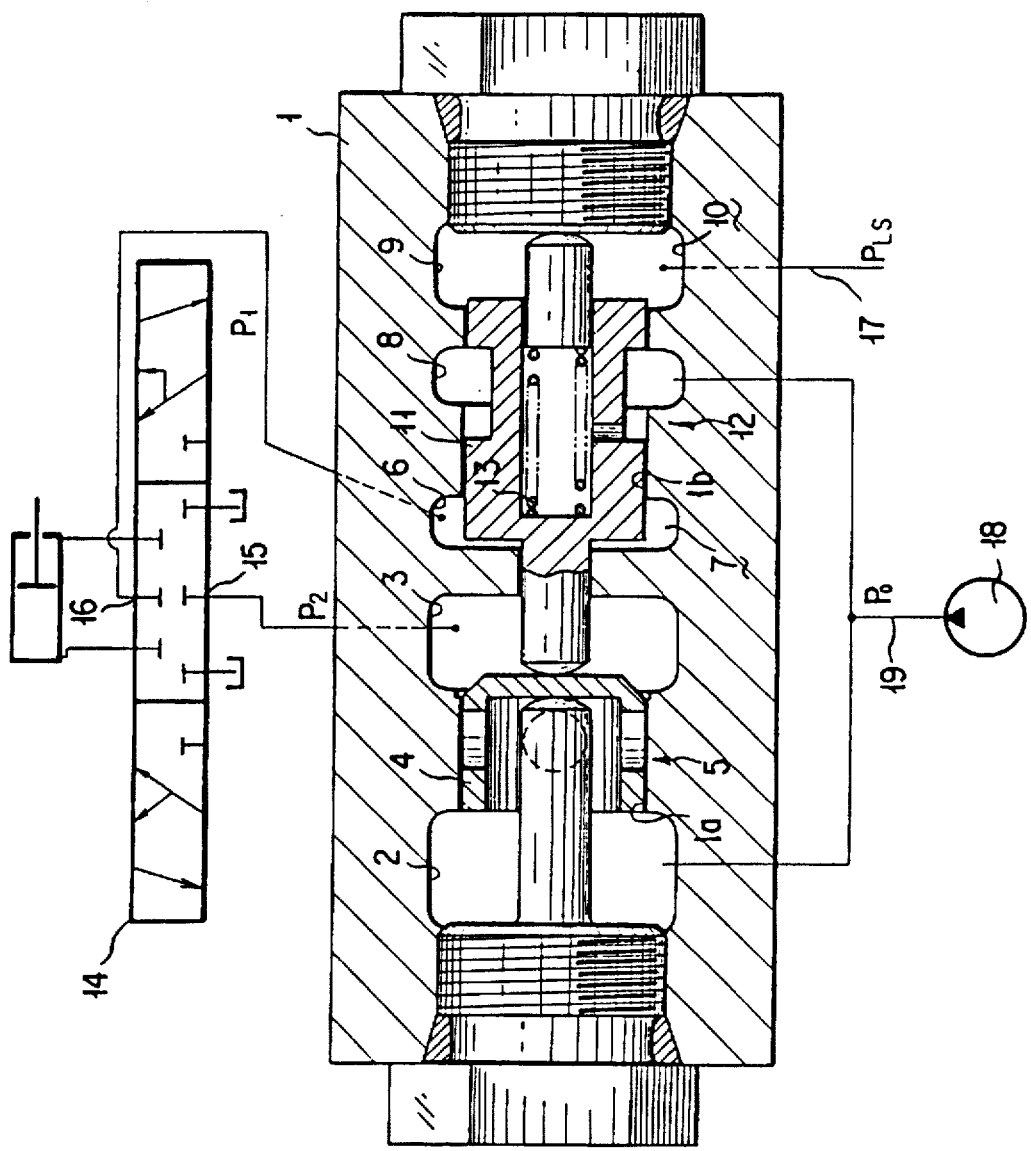
FIG. 1 is a cross sectional view illustrating a pressure compensation valve in the prior art.

Hereinafter, a suitable embodiment of the present invention with respect to a pressure compensation valve will be set forth with reference to the accompanying drawing hereof.

An explanation will now be given of a certain embodiment of the present invention with references to FIG. 3. The same components or members as in the prior art are designated by the same reference numerals.

Figure 3:
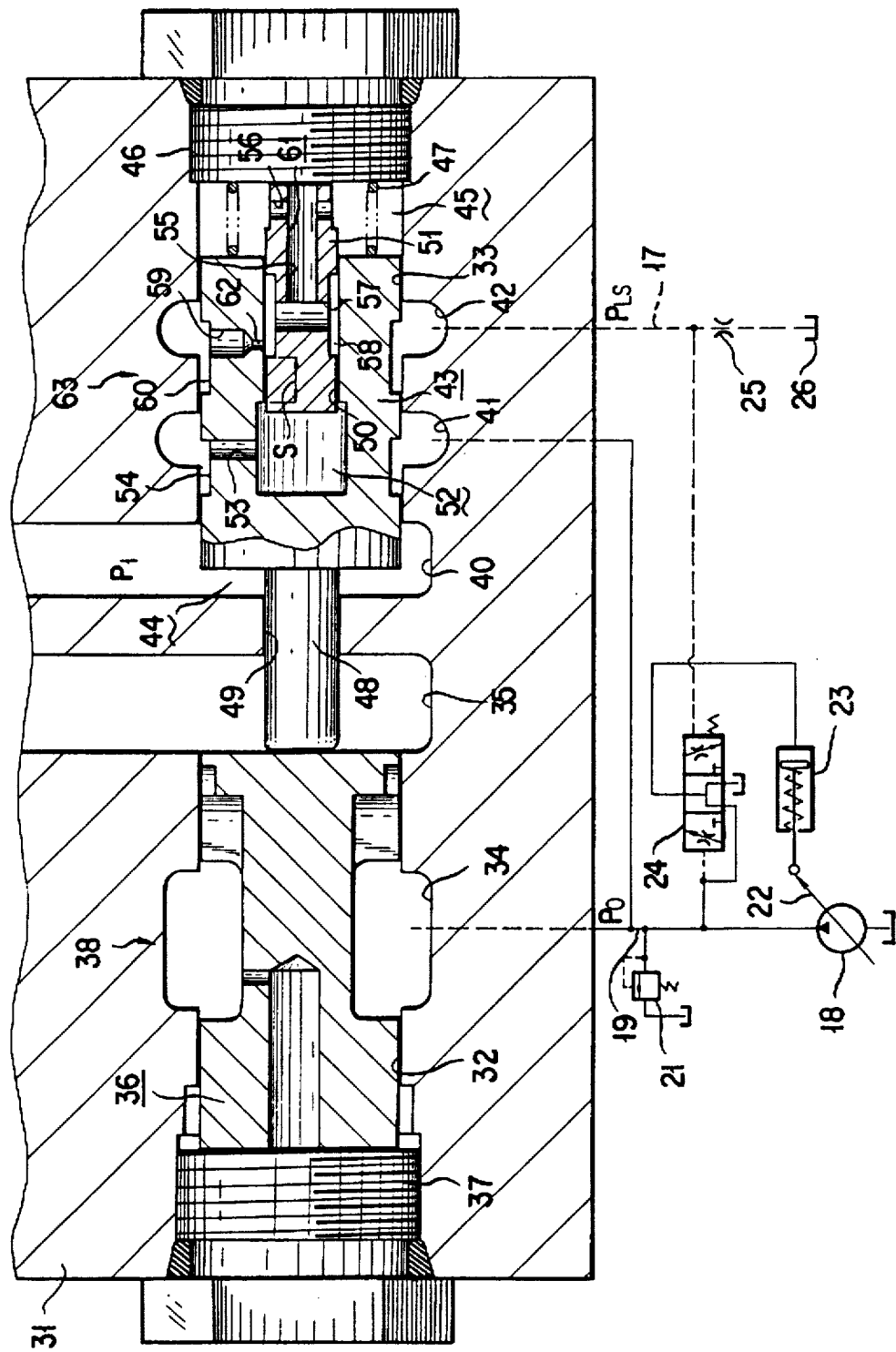
FIG. 3 is a a cross sectional view illustrating a pressure compensation valve according to the present invention.

As illustrated in FIG. 3, a valve body 31 is formed therein with a check valve bore 32 and a pressure reduction valve bore 33 which are disposed coaxially in an opposing relationship with each other. The said check valve bore 32 is formed with an inlet port 34 and an outlet port 35. The said check valve bore 32 has a valve 36 fittedly inserted slidably therein and the said valve 36 is restrained with a plug 37 not to be slid leftwards from the position shown and thus constitutes a check valve portion 38.

The above mentioned pressure reduction valve bore 33 is formed with a first port 40, a second port 41 and a third port 42. The said pressure reduction valve bore 33 has a spool 43 slidably fitted therein and is configured to have at its both sides, respectively, a first pressure chamber 44 that is opening to the said first port 40 and a second pressure chamber 45 whose communication with the said third port 42 is established and blocked. The said spool 43 is adapted to be thrusted leftwards by a spring 47 that is provided between itself and a plug 46 at the right hand side and, as a result, a pushing rod 48 integrally formed with the spool 43 is allowed to project through a penetrating bore 49 to bring the above mentioned valve 36 into abutment on a plug 37.

A load piston 51 is slidably inserted fittedly in a blind bore 50 that is provided axially in the above mentioned spool 43, and a pressure receiving chamber 52 is formed in an area closer to the bottom of the said blind bore 50. The said pressure receiving chamber 52 is designed to communicate via a radially extending, first bore 53 with a small diameter portion 54 of the said spool 43 and is thereby allowed to normally communicate with the said second port 41. The above mentioned load piston 51 is formed axially with a fluid bore 55. The said fluid bore 55 is designed to normally communicate via a diametrically extending, second bore 56 with the said second pressure chamber 45 and also to be opening via a diametrically extending, third bore 57 and a small diameter portion 58 to the peripheral surface of the said load piston 51. The said small diameter portion 58 is adapted to normally communicate with the said third bore 42 via a throttle 62 such as a narrow hole, a radially extending, fourth bore 59 and a second small diameter portion 60 which are formed of the said piston 43. And, in the interior of the said spool 43, there is formed an internal passage 61 that communicates the said second port 41 and the said second pressure receiving chamber 45 with each other via the said first small diameter portion 54, the said first bore 53, the said pressure receiving chamber 52, the said small diameter portion 58, the said third bore 57, the said fluid bore 55 and the said second bore 56, when the said spool 43 has taken a right hand side position against the resilient force of the said spring 47. Further, the said internal passage 61 is designed to communicate via the said throttle 62 and the said fourth bore 59 with the said third port 42. There is thus constituted a pressure reduction valve portion 63.

An explanation will next be given with respect to the operation of the above mentioned embodiment of the present invention.

If the said spool 43 from the position shown in FIG. 3 is thrusted rightwards under a self-load pressure $P_1$ within the said first pressure chamber 44 and its distance of displacement exceeds a value S, the said pressure receiving chamber 52 will communicate with the said small diameter portion 58 of the load piston 51 and the said second port 41 will communicate via the said internal passage 61 with the said second pressure chamber 45. As a result, a pump discharge pressure $P_O$ will act on the above mentioned second pressure chamber 45 and the said spool 43 will thereby perform a pressure reduction operation (an operation made with the spool 43 allowed to slide leftwards to thrust the valve 36 in its blocking direction) and will eventually come to a halt at a position at which the self-load pressure $P_1$ within the said first pressure chamber 44 and the pressure within the said second pressure chamber 45 are made equal to each other.

The pressure fluid within the above mentioned second pressure chamber 45 will be allowed to flow from the said second bore 56, the said fluid bore 55, the said third bore 57, the said throttle 62, the said fourth bore 59 and the said second small diameter portion 60 out into the said third port 42 and in turn into the load pressure detecting path 17. Then, since the said load pressure detecting path 17 is connected via the throttle 25 to the reservoir 26, a constant flow will be created and also a pressure difference will develop between behind and ahead of the said throttle 62. As a result, a load pressure $P_{LS}$ will thereby be made lower than the pressure within the said second pressure chamber 45.

This being the case, it can be seen that when an actuator has taken its displacement end position to allow the load pressure $P_1$ and the pump discharge pressure $P_O$ to be made equal to each other and then the pressure within the said second pressure chamber 45 becomes the pump discharge pressure $P_O$, the load pressure $P_{LS}$ that appears as an output at the said third port 42 will be lower than the pump discharge pressure $P_O$ by an amount that is commensurate with the diameter of the said throttle 62.

Figure 2:
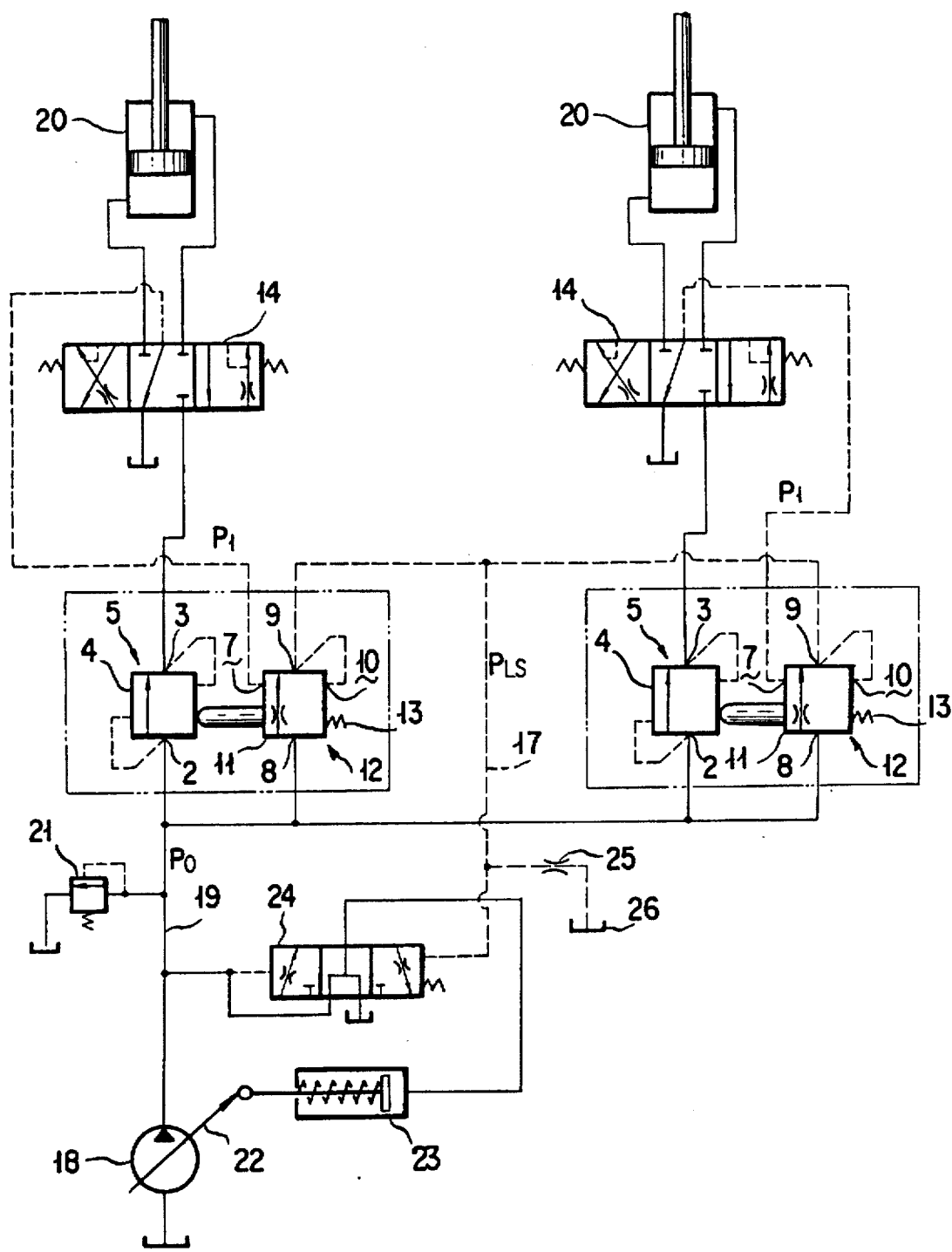
FIG. 2 is a circuit diagram of a hydraulic circuit using the pressure compensation valve in the prior art.

Accordingly, in case where the present embodiment is applied to a hydraulic circuit as shown in FIG. 2, it can be seen that even if an actuator has taken its displacement end position, with the load pressure $P_{LS}$ within the said load pressure detecting path 17 made lower than the pump discharge pressure $P_O$ the pressure within the said second pressure chamber 45 of the pressure reduction valve portion 63 in the pressure compensation valve that is connected to any other actuator which has not yet reached its displacement end position will likewise be made lower than the pump discharge pressure $P_O$. As a result, the said valve 36 under the pump discharge pressure $P_O$ at the said inlet port 34 will be thrusted in its communicating direction to close neither the said inlet port 3 nor the said outlet port 35, thereby permitting the pump discharge pressure fluid to be fed to all the actuators.

Also, since the pressure difference between the pressure within the second pressure chamber 45 and load pressure $P_{LS}$ can here be changed as desired by changing the diameter of the throttle 62, a pressure compensation valve according to the present invention may be of any pressure compensation characteristic as optionally selected to enhance the control performance of actuators.

While the present invention has hereinbefore been described with respect to certain illustrative embodiments thereof, it will readily be appreciated by a person skilled in the art to be obvious that many alterations thereof, omissions therefrom and additions thereto can be made without departing from the essence and the scope of the present invention. Accordingly, it should be understood that the present invention is not limited to the specific embodiments thereof set out above, but includes all possible embodiments thereof that can be made within the scope with respect to the features specifically set forth in the appended claims and encompasses all equivalents thereof.

What is claimed is:

1. A pressure compensation valve, characterized in that it comprises:

a check valve portion having an inlet port that is connected to a discharge path of a hydraulic pump, an outlet port that is connected to an inlet side of a directional control valve and a valve for controlling an area of opening between both said ports; and a pressure reduction valve portion which is comprised of a spool that defines at its both sides a first pressure chamber and a second pressure chamber, respectively, and is adapted to be slidable to to allow said valve to be thrusted in a first direction in which said area of opening is increased under a self-load pressure applied to said first pressure chamber and to be slidable to allow said valve to be thrusted in a second direction in which said area of opening is decreased under a pressure within said second pressure chamber, an internal passage that is formed inside of said spool and that is adapted to supply a discharge pressure fluid of said hydraulic pump to said second pressure chamber when said spool has been slid to assume not less than a predetermined displacement made in said first direction, a first throttle that is disposed in said internal passage, and a port for establishing a communication between a load pressure detecting path that is connected via a second throttle to a reservoir and said first throttle.

2. A pressure compensation valve as set forth in claim 1, characterized in that:

said valve of said check valve portion and said spool of said pressure reduction valve portion are arranged to be each slidable and are disposed coaxially in an opposing relationship with each other in a valve body;

when said valve has been slid towards said spool by a preselected distance, said inlet port and said outlet port are adapted to communicate with each other;

said spool is adapted to be slid under a pressure in said first pressure chamber in said first direction away from said valve and to be slid under a pressure in said second pressure chamber in said second direction towards said valve;

said valve body is formed therein with a port that is connected to a discharge path of said hydraulic pump; and when said spool has been slid by a given distance in said first direction, said internal passage in said spool is adapted to allow the last mentioned port to communicate with said second chamber.

* * * * *